(12) United States Patent
Chetlur et al.

(10) Patent No.: US 9,225,494 B2
(45) Date of Patent: Dec. 29, 2015

(54) NETWORK AND USER BEHAVIOR BASED TIME-SHIFTED MOBILE DATA TRANSMISSION

(71) Applicant: International Business Machines Corporation, Armonk, NY (US)

(72) Inventors: Malolan Chetlur, Bangalore (IN); Shivkumar Kalyanaraman, Bangalore (IN); Hemant Jagdish Kowshik, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/164,461

(22) Filed: Jan. 27, 2014

(65) Prior Publication Data
US 2014/0140329 A1    May 22, 2014

Related U.S. Application Data

(63) Continuation of application No. 13/590,751, filed on Aug. 21, 2012, now Pat. No. 8,818,392.

(51) Int. Cl.
*H04L 12/28* (2006.01)
*H04L 5/00* (2006.01)
*H04W 72/12* (2009.01)

(52) U.S. Cl.
CPC ......... *H04L 5/0085* (2013.01); *H04W 72/1252* (2013.01); *H04W 72/1242* (2013.01)

(58) Field of Classification Search
CPC .......... H04W 72/042; H04W 72/0413; H04W 72/0446; H04W 72/048; H04W 72/12; H04W 72/00; H04W 72/04; H04W 72/1226; H04W 72/1247; H04W 72/1242; H04W 72/1252; H04W 72/0486; H04W 28/18; H04W 28/0289; H04L 5/0085; H04L 1/1854; H04L 12/1881

USPC ............ 455/450, 452.1, 452.2, 453; 370/329, 370/330, 336, 395.4, 395.41, 444, 230, 370/230.1, 343, 395.2–395.43, 436, 443, 370/461
See application file for complete search history.

(56) References Cited

U.S. PATENT DOCUMENTS 6,154,778 A * 11/2000 Koistinen et al. ............. 709/228
7,860,024 B1   12/2010 Greenberg et al.
(Continued)

FOREIGN PATENT DOCUMENTS

| CN | 1875422 A | 12/2006 | |
| EP | 1039366 A2 * | 9/2000 | ................ G06F 3/06 |
| WO | 2012049498 A1 | 4/2012 | |

OTHER PUBLICATIONS

Motorola Inc; Long Term Evolution (LTE): A Technical Overview (technical white paper), 2008.
(Continued)

*Primary Examiner* — Magdi Elhag
(74) *Attorney, Agent, or Firm* — Garg Law Firm, PLLC; Rakesh Garg; Parashos T. Kalaitzis

(57) ABSTRACT

A computer program product for mobile data transmission is provided in the illustrative embodiments. A request for data is received from a mobile device. A determination is made whether a data transmission over a mobile data communication network in response to the request can be delayed, forming a time-shifting determination. A determination is made, responsive to the time-shifting determination being affirmative, a delayed schedule for the data transmission in response to the request such that the data transmission is completed by a deadline. The data is transmitted over the mobile data communication network according to the delayed schedule.

5 Claims, 9 Drawing Sheets

(56) References Cited

U.S. PATENT DOCUMENTS

| | | |
|---|---|---|
| 8,095,635 B2 | 1/2012 | Wang et al. |
| 8,099,493 B2 | 1/2012 | Cranor et al. |
| 8,107,479 B2 | 1/2012 | Bellovin et al. |
| 2006/0036764 A1 | 2/2006 | Yokota et al. |
| 2007/0155395 A1* | 7/2007 | Gopalakrishnan et al. ... 455/453 |
| 2007/0243888 A1* | 10/2007 | Faccin ........................ 455/461 |
| 2008/0242290 A1* | 10/2008 | Bhatia et al. ............... 455/422.1 |
| 2009/0252124 A1* | 10/2009 | Yeo et al. ..................... 370/336 |
| 2009/0291672 A1* | 11/2009 | Treves et al. ............... 455/414.1 |
| 2010/0105414 A1* | 4/2010 | Ioppe et al. ................. 455/456.3 |
| 2010/0311435 A1* | 12/2010 | Mueck et al. ................. 455/453 |

OTHER PUBLICATIONS

International search report, Nov. 7, 2013.

Notification of transmittal of the international search report and the written opinion of the international searching authority, or the declaration, Nov. 7, 2013.

Written opinion of the international searching authority, Nov. 7, 2013.

\* cited by examiner

NETWORK AND USER BEHAVIOR BASED TIME-SHIFTED MOBILE DATA TRANSMISSION

The present application is a DIVISIONAL nonprovisional application claiming the priority of the filing date of the co-pending and commonly assigned U.S. patent application Ser. No. 13/590,751, having a similar title, and filed on Aug. 21, 2012.

BACKGROUND

1. Technical Field

The present invention relates generally to a method, system, and computer program product for mobile communications. More particularly, the present invention relates to a method, system, and computer program product for network and user behavior based time shifted mobile data transmission.

2. Description of the Related Art

Mobile data communication essentially is data communication using a mobile device at least at one end of the data communication. The data being communicated to or from the mobile device may be voice data, video data, application data, session management data, or many other types of data.

Some mobile data communications are interactive or time-sensitive data communications, in other words, synchronous data communications. For example, voice data is time sensitive in that the data has to be transmitted to and from a mobile device without perceptible delays, otherwise the voice communication becomes unacceptable. As another example, a banking transaction may be synchronous because a transaction has to complete within stipulated time and other transactions cannot proceed until a preceding transaction has completed.

Some other mobile data communications are background communications, or not time sensitive in nature, in other words, asynchronous data communications. For example, a file backup operation may occur in the background, may be interrupted and restarted over a period without affecting the end result of creating a backup to or from a mobile device.

SUMMARY

The illustrative embodiments provide a method, system, and computer program product for mobile data transmission. One embodiment receives a request for data from a mobile device. The embodiment determines, using a processor and a memory, whether a data transmission over a mobile data communication network in response to the request can be delayed, forming a time-shifting determination. The embodiment further determines, responsive to the time-shifting determination being affirmative, a delayed schedule for the data transmission in response to the request such that the data transmission is completed by a deadline. The embodiment transmits over the mobile data communication network the data according to the delayed schedule.

In another embodiment, determining the delayed schedule further includes determining a probability density function (PDF) of network load in the mobile data communication network over a period, wherein the PDF of network load is determined using historical network load data collected from a set of mobile data communication network infrastructure components. The embodiment further includes determining a pattern of movement (mobility pattern) of the mobile device during the period. The embodiment further includes computing a load threshold using the network load PDF and the mobility pattern, such that transmitting the data only when network load is below the load threshold satisfies the deadline. The embodiment further includes computing a rate of transmission corresponding to the load threshold, wherein the delayed schedule is based on the rate of transmission.

Another embodiment further includes recomputing the load threshold at a set interval, or at an occurrence of an event in the mobile data communication network.

In another embodiment, determining the delayed schedule further includes receiving a plurality of requests from a corresponding plurality of mobile devices, wherein each request in the plurality of requests has a corresponding deadline, and wherein the request is one of the plurality of requests and the deadline is one of the plurality of deadlines. The embodiment further includes arranging the plurality of requests in an order of shortest deadline to longest deadline. The embodiment further includes determining a pattern of movement (mobility pattern) of the mobile device during a period. The embodiment further includes determining a PDF of channel quality in the mobile data communication network over the period, wherein the PDF of channel quality is determined using historical channel quality data collected along the mobility patterns during the period. The embodiment further includes computing a signal threshold using the channel quality PDF and the mobility pattern, such that transmitting the data only when signal quality to the mobile device exceeds the signal threshold satisfies the deadline. The embodiment further includes identifying a time slot when the signal quality to the mobile device exceeds the signal threshold, wherein the delayed schedule is based on the identified time slot, and wherein the data is transmitted using the time slot. The embodiment further includes scheduling to transmit second data in response to a second request in the plurality of requests in a second time slot.

Another embodiment further includes recomputing the signal threshold at one of (i) a set interval, and (ii) at an occurrence of an event in the mobile data communication network.

In another embodiment, determining the delayed schedule further includes determining a pattern of movement (mobility pattern) of the mobile device during a period. The embodiment further includes determining a PDF of channel quality in the mobile data communication network over the period, wherein the PDF of channel quality is determined using historical channel quality data collected along the mobility patterns during the period. The embodiment further includes computing a weight parameter using the channel quality PDF and the mobility pattern. The embodiment further includes computing, at a data transmission time slot, a product of the weight parameter and a signal quality to the mobile device, wherein the delayed schedule uses the data transmission time slot responsive to the product having highest value amongst a plurality of products corresponding to a plurality of requests during the data transmission time slot.

Another embodiment further includes recomputing the weight parameter at a set interval, or at an occurrence of an event in the mobile data communication network.

Another embodiment further includes determining whether the network load exceeds a load threshold, wherein the data transmission in response to the request is not delayed responsive to the time-shifting determination being negative, or the network load not exceeding the load threshold.

Another embodiment further includes sending a set of deadlines and a corresponding set of incentives to the mobile device. The embodiment further includes receiving a selection of the deadline from the set of deadlines, wherein the deadline delivers a corresponding incentive from the set of incentives to the mobile device during the data transmission.

In another embodiment, the corresponding incentive is an improved user experience in consuming data of the data transmission.

In another embodiment, the corresponding incentive is an improved quality of service (QoS) during the data transmission.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
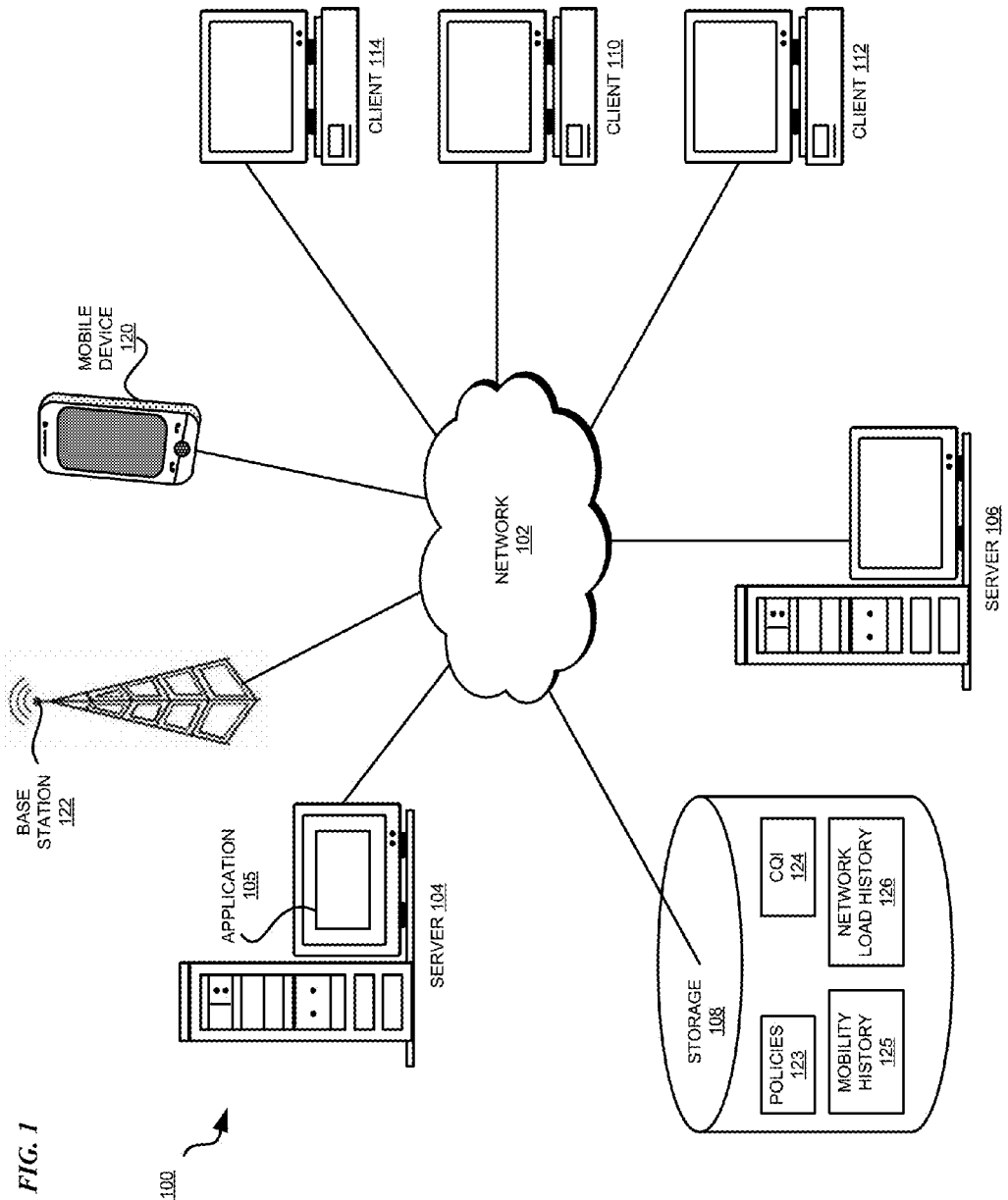
FIG. 1 depicts a pictorial representation of a network of data processing systems in which illustrative embodiments may be implemented.

An explosive growth in mobile data traffic is occurring given the rapid adoption of mobile devices such as smartphones, tablet computers, and embedded mobile computing platforms. The mobile data traffic includes mobile data communications for applications such as audio, video, and gaming applications, that are time-sensitive and require near-real-time quality of service (QoS).

The illustrative embodiments recognize that mobile traffic exhibits a distinct diurnal pattern in aggregate network load. For example, the mobile data traffic volume varies greatly between peak and off-peak times. The illustrative embodiments recognize that at peak load times, the performance of mobile applications degrades uniformly, i.e., when the mobile network is experiencing higher than threshold loads, all types of mobile data communications suffer from the scarcity of bandwidth. For example, mobile services consumers are all too familiar with video lags, choppy voice communications, call drops, slow webpage loads, and transaction timeouts during peak hours designated by the mobile carriers.

Network upgrades, capacity increases, or additional spectrum purchase are cost-prohibitive answers to the explosive demand in mobile data communications. Provisioning for peak usage is expensive and results in poor utilization during off-peak periods. Mobile communication network operators are under pressure the make the most of the available network infrastructure and wireless spectrum to meet the demand in a satisfactory manner. The illustrative embodiments recognize that reducing peak load is key to improving mobile data communication experience without performing expensive network upgrades.

The illustrative embodiments used to describe the invention generally address and solve the above-described problems and other problems related to providing mobile data communications. The illustrative embodiments provide a method, system, and computer program product for network and user behavior based time shifted mobile data transmission.

Mobility pattern is a record of a mobile device's position over a period. An embodiment uses a mobile data requestor's future positions—a trajectory—using mobility patterns of the mobile device associated with the requestor. A requestor can be a user of the mobile device or an application executing on the mobile device.

Channel quality is a record of an indicator of quality of mobile data communication channel that existed between a base-station and a mobile device over a period. Signal strength is one example indicator of channel quality. Noise to signal ratio is another example of such indicator. Many other indicators will be conceivable from this disclosure by those of ordinary skill in the art and the same are contemplated within the scope of the illustrative embodiments.

The illustrative embodiments recognize that mobile data consumers present predictable mobility patterns with corresponding patterns in channel quality variation. The illustrative embodiments recognize that some requestors are either inherently tolerant to data transmission delay, or can be made to behave as such by providing incentives. For example, requestors requesting predictable traffic like news-videos, podcasts, sync services, Software upgrades, and large file transfers can be incentivized with better QoS for time-shifted transmission of the requested data.

An embodiment selects certain mobile data transmissions to a mobile device for time-shifting. Time-shifting is the process of delaying or shifting a transmission time for a part of a selected data transmission to a mobile device. For example, delay-sensitive mobile data traffic, such as video-on-demand, consumes more resources than an equivalent file transfer of similar size. An embodiment attempts to time-shift resource-expensive traffic to help alleviate network peak load.

An embodiment provides improved performance as an incentive to accepting time-shifted delivery of requested data. For example, an application may request a video-on-demand during peak load time. If the data communication continues to provide the video-on-demand service at that time, the video experience is likely to suffer from buffering delays and interruptions. On the other hand, if the video-on-demand service is postponed, or time-shifted, for another time, such as an off-peak time, or when the user has traveled into an area of less than peak load, the user has the incentive of a better video experience at the cost of a delaying that experience.

Generally, an embodiment matches time-elastic mobile data demand with varying network resource availability. In other words, an embodiment identifies delay-tolerant data transmission requests or requestors, negotiates a transmission deadline for the request, for example in exchange for some incentive, and time-shifts the data transmission to a later time when network resources are available above a threshold level.

If the data transmission is time-sensitive, an embodiment may negotiate a shorter than a threshold deadline to time-shift the transmission. If the data transmission is not time-sensitive, an embodiment may negotiate a deadline that is longer than a threshold to time-shift the transmission. Thus, an embodiment achieves network load reduction by time-shifting data transmissions and delivering the requested data by the negotiated deadline.

The illustrative embodiments recognize that asking users or mobile applications repeatedly and during the data demand is impractical. The illustrative embodiments use statistical analysis of historical requestors' usage behavior, historical network load behavior, and historical conditions of the mobile data communication channel (channel conditions) for the requestors to devise scheduling strategies that meet data delivery deadlines.

When an embodiment negotiates a deadline in exchange for performance incentives, the negotiations can be transparent to the user of the mobile device. For example, the user can pre-configure an application to negotiate a time-shifted deadline for certain type of data transmissions.

The illustrative embodiments are described with respect to certain devices only as examples. Such descriptions are not intended to be limiting on the invention. For example, an illustrative embodiment described with respect to a smartphone mobile device can be implemented with respect to an embedded mobile computing platform in an automobile without limitation.

The illustrative embodiments are described with respect to certain data only as examples. Such descriptions are not intended to be limiting on the invention. For example, an illustrative embodiment described with respect to a smartphone mobile device using video-on-demand can be implemented with respect to an embedded mobile computing platform in an automobile requesting map database update within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
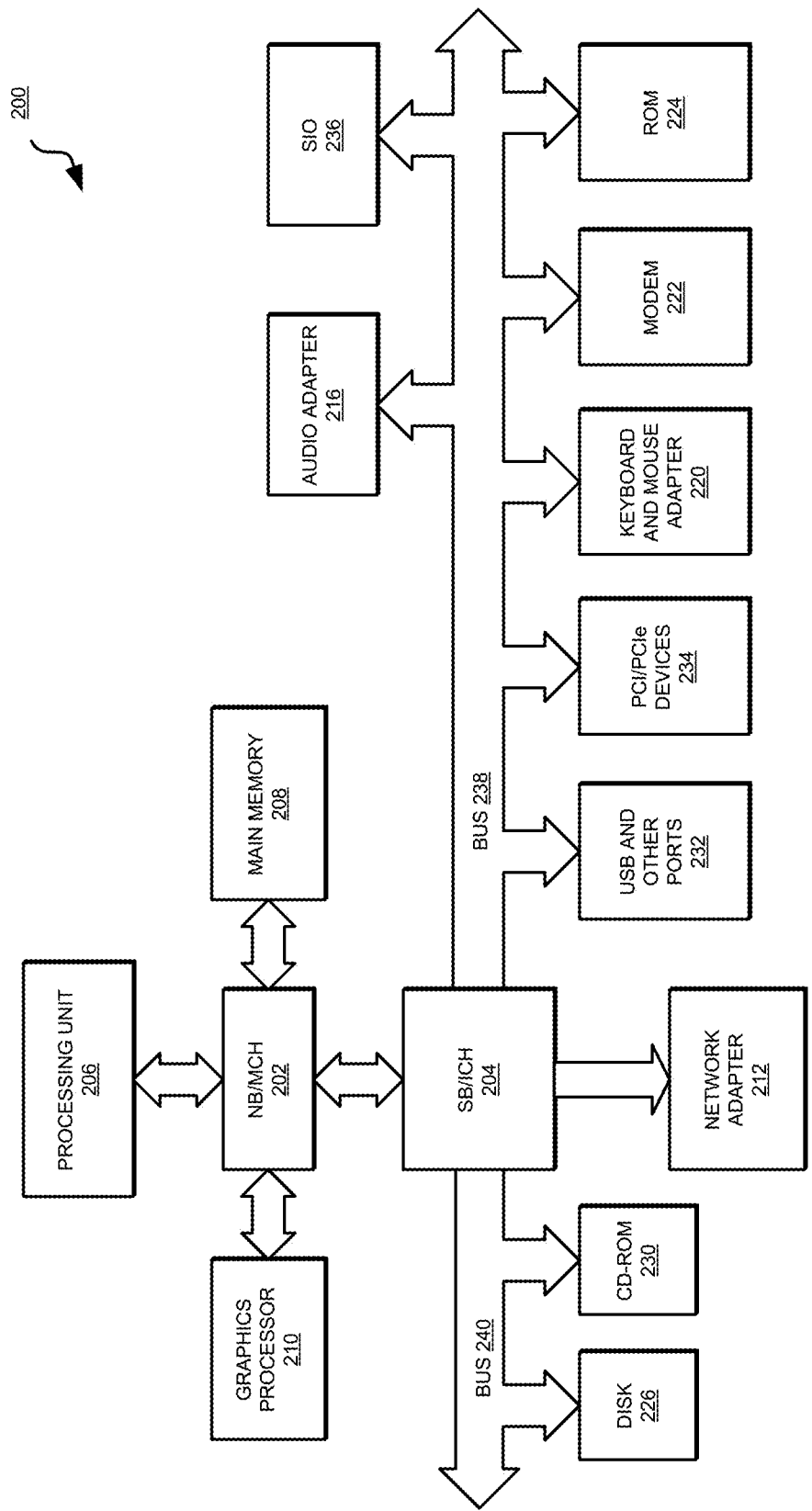
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of data processing systems in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any data processing system or device in data processing environment 100.

Clients 110, 112, and 114 also couple to network 102. A data processing system, such as server 104 or 106, or client 110, 112, or 114 may contain data and may have software applications or software tools executing thereon.

In addition, mobile device 120 may be any suitable mobile data processing system capable of performing mobile data communication using mobile communications infrastructure, such as, but not limited to base-station 122. Base-station 122, a wireless access point, a micro cell device, a pico cell device, or a femto cell device, or a wireless antenna are some examples of mobile communication infrastructure that can communicate with backend systems, such as server 104, or to another network via network 102. Application 105 in server 104 implements all or part an embodiment. In cases where an embodiment is implemented in multiple modules or components, such modules or components may be distributed to other data processing systems, such as server 106 or client 112 (distributed components not shown) in the form of other applications. Certain features of an embodiment can be implemented in mobile device 120, base-station 122, server 104, or a combination thereof, without limitation, and depending on the particular implementation. Storage 108 includes policies data 123, channel quality data (channel quality index, "CQI") 124, mobility history 125, and network load history 126 for use according to an embodiment. Policies data 123, channel quality data (channel quality index, "CQI") 124, mobility history 125, and network load history 126 may each be stored in any suitable form in storage 108, such as in the form of a database, file, or any other suitable data structure.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

Servers 104 and 106, storage unit 108, and clients 110, 112, and 114 may couple to network 102 using wired connections, wireless communication protocols, or other suitable data connectivity. For example, a cluster typically has multiple network types, such as IP networks, direct connections of machines via packets exchange implemented by storage protocols (Fibre Channel, SCSI), serial links, and message exchange via writing and reading packets to shared storage such as a hard disk drive. For performance reasons, in sending client traffic, an IP network is given precedence. Furthermore, a given network type may not connect to all nodes in a cluster. For instance, a cluster may span machines located at two geographically distant sites. For the long distance connection, Ethernet may be the preferred connection, and within a geographical location, a direct connection may be preferable. Additionally, within a geographical location, additional non-IP networks, such as Fibre channel or serial connections may be used within the scope of the illustrative embodiments.

Clients 110, 112, and 114 may be, for example, personal computers, network computers, thin clients, or industrial control systems. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another, and encompasses components including but not limited to IP and SAN components. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), a wide area network (WAN), or mobile ad hoc network (MANET). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104, server 106, or client 112 in FIG. 1, or another type of device in which computer usable program code or instructions implementing the processes of the illustrative embodiments may be located for the illustrative embodiments. Data processing system 200 is also representative of a computing device, such as mobile device 120 in FIG. 1 in which computer usable program code or instructions implementing the processes of the illustrative embodiments may be located for the illustrative embodiments. Data processing system 200 is also representative of an embedded mobile computing device, such as a data processing system embedded in a vehicle (not shown) in which computer usable program code or instructions implementing the processes of the illustrative embodiments may be located for the illustrative embodiments. Data processing system 200 is described as a computer only as an example, without being limited thereto. Implementations in the form of mobile device 120 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Program instructions for the operating system, the object-oriented programming system, the processes of the illustrative embodiments, and applications or programs, including application 105, are located on one or more storage devices, such as hard disk drive 226 or CD-ROM 230, and may be loaded into at least one of one or more memories, such as main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
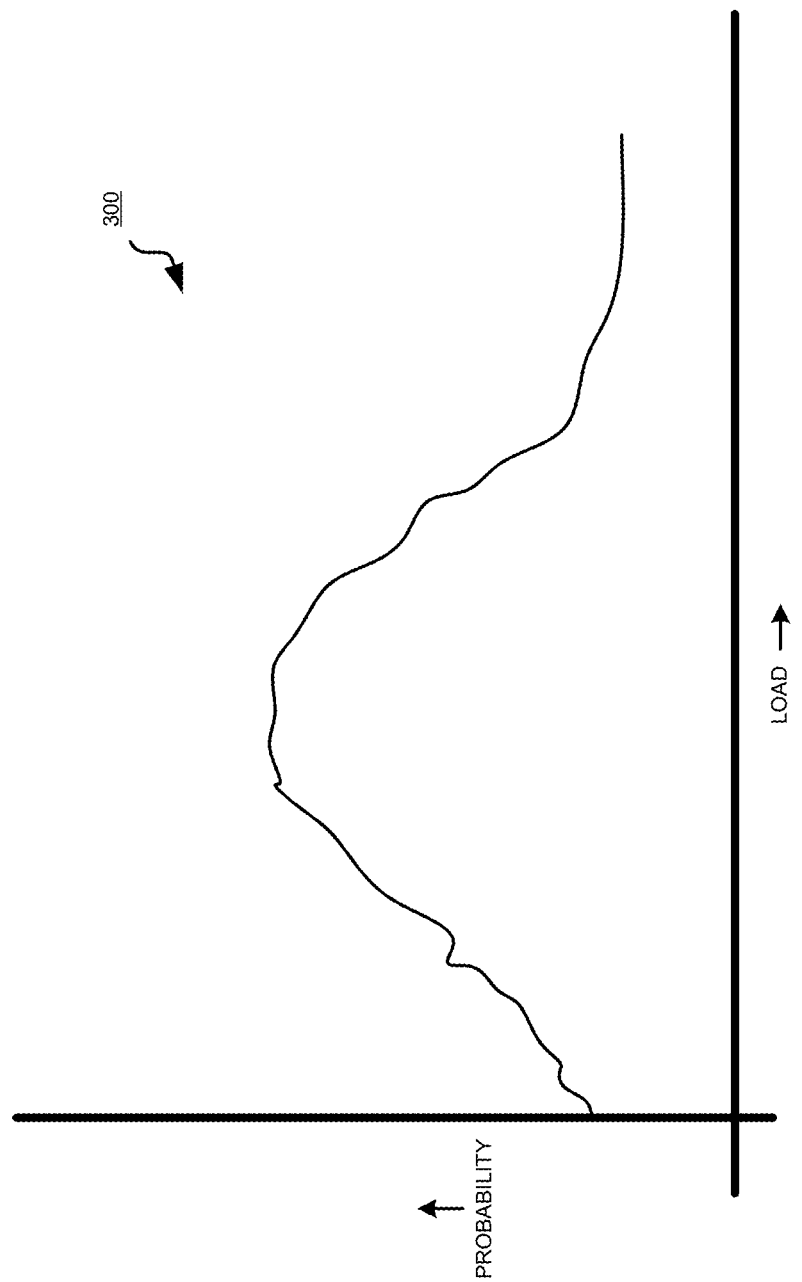
FIG. 3 depicts an example network load probability density function graph that is usable in an illustrative embodiment.

With reference to FIG. 3, this figure depicts an example network load probability density function graph that is usable in an illustrative embodiment. Probability density function (PDF) graph 300 can be constructed using historical data from network load history data 126 in storage 108 in FIG. 1. Graph 300 depicts the load on the X-axis, and the probability of a value of the load occurring on the Y-axis, over a given period.

Figure 4:
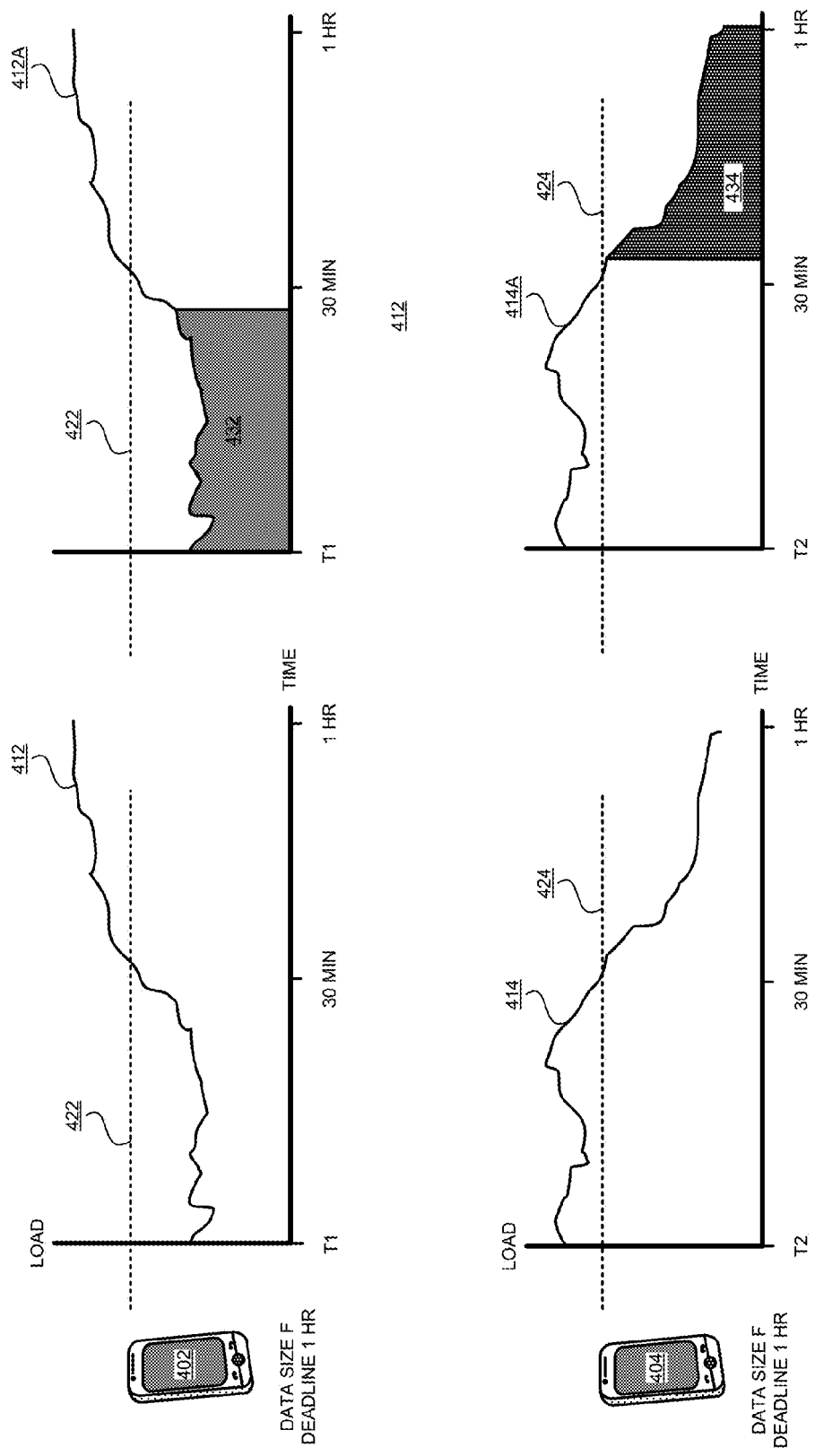
FIG. 4 depicts some example cases of time-shifting data transmissions in accordance with an illustrative embodiment.

With reference to FIG. 4, this figure depicts some example cases of time-shifting data transmissions in accordance with an illustrative embodiment. Mobile devices 402 and 404 may be an example of mobile device 120 in FIG. 1 at different times. Graphs 412 and 414 are constructed for projecting network load over different periods using network load history data 126 in FIG. 1. Period markings are shown at thirty minutes and one hour only as examples for clarity and not as a limitation on an embodiment.

Assume that mobile device 402 has to transfer data of size F and has agreed to a deadline of one hour. Assume, as shown in graph 412 that at time T1, network load is expected to be lower than threshold 422 for a part of the one-hour negotiated deadline and then exceed threshold 422 for the remainder of the period. Accordingly, an embodiment determines that the data transmission can be accomplished during time slot 432 as depicted in graph 412A, which is identical to graph 412.

Similarly, assume that mobile device 404 has to transfer data of size F and has also agreed to a deadline of one hour. Assume, as shown in graph 414 that at time T2, network load is expected to exceed threshold 424 for a part of the one-hour negotiated deadline and then reduce below threshold 424 for the remainder of the period. Accordingly, an embodiment determines that the data transmission can be accomplished during time slot 434 as depicted in graph 414A, which is identical to graph 414.

Figure 5:
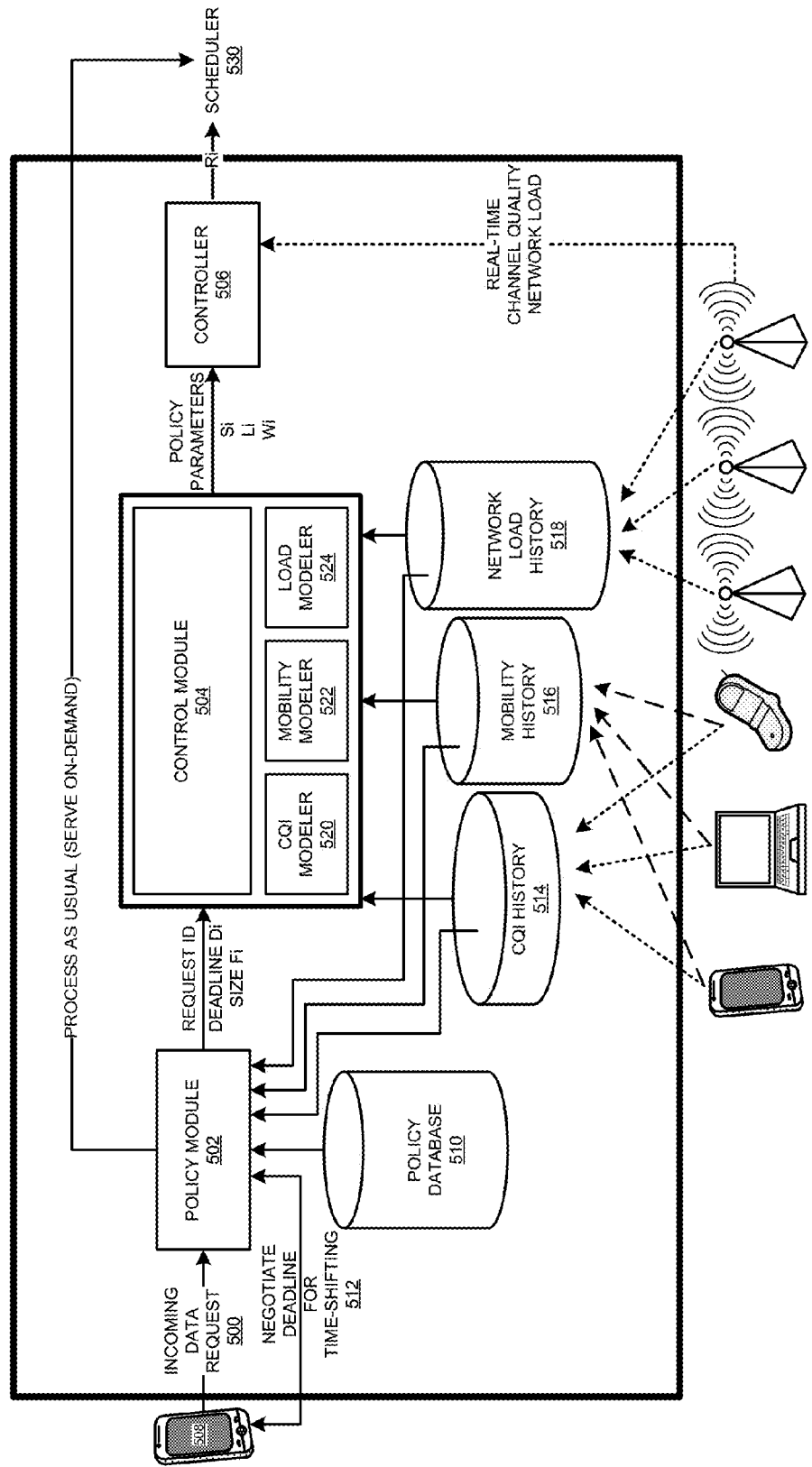
FIG. 5 depicts a block diagram of an example configuration for network and user behavior based time shifted mobile data transmission in accordance with an illustrative embodiment.

With reference to FIG. 5, this figure depicts a block diagram of an example configuration for network and user behavior based time shifted mobile data transmission in accordance with an illustrative embodiment. Policy module 502, control module 504, and controller 506 can be implemented as application 105 in FIG. 1. In one embodiment, application 105 in FIG. 1 implements one of policy module 502, control module 504, and controller 506, and the remaining modules are each implemented as separate applications, distributed and executed on data processing systems in the manner of application 105 on server 104 in FIG. 1.

Policy module 502 accepts data requests from any number of mobile devices. For example, policy module 502 accepts request 500 from mobile device 508, which is i-the requestor amongst n requestors. Mobile device 508 is analogous to mobile device 402 or 404 in FIG. 4.

Policy database 510 corresponds to policies data 123 in FIG. 1. Channel quality history database 514 corresponds to CQI data 124 in FIG. 1 and includes channel quality information collected from mobile devices on the mobile network. Mobility history database 516 corresponds to mobility history data 125 in FIG. 1 and includes position information, such as location and rate of transition through cells, collected from mobile devices on the mobile network. Network load history database 518 corresponds to network load history data 126 in FIG. 1 and includes load data collected from network infrastructure components such as base-stations. Policy database 510, channel quality history database 514, mobility history database 516, and network load history database 518 are example manifestations of their corresponding counterparts in FIG. 1, without implying a limitation of any particular database structure or form.

Policy database 510 provides to policy module 502 one or more policies or rules to use in computing a time-shifted deadline and a corresponding incentive. Mobility history database 516 provides requestor mobile device 508's trajectory. Channel quality history database 514 provides historical channel quality information along requestor mobile device 508's trajectory. Network load history database 518 provides historical network load information along requestor mobile device 508's trajectory during previous times similar to the time of request 500.

Using the inputs from policy database 510, channel quality history database 514, mobility history database 516, and network load history database 518, policy database module 502 computes one or more sets of deadlines and corresponding incentives to offer to mobile device 502.

Using the deadlines and incentives, policy module 502 negotiates 512 a deadline for transmitting the requested data. Mobile device 508 being the i-th requestor, policy module 502 sends the negotiated deadline $D_i$ for the requested data size of $F_i$ to control module 504. If no deadline can be negotiated, policy module 502 instructs scheduler 530 in the mobile network infrastructure to schedule the data transmission of the requested data upon request, i.e., serve-on-demand.

Control module 504 includes components for modeling PDFs using historical information. For example, mobility modeler 522 builds patterns of mobility between cells for a single requestor or a single class of requestors at a given time of day using a trajectory learning algorithm on the data furnished by the mobility history database 516.

Using channel quality history database 514 and mobility history database 516, CQI modeler 520 builds statistical models—PDFs—of the wireless channel quality seen at a particular location in a given time window. Operating in conjunction with mobility modeler 522, CQI modeler 520 builds statistical models of the wireless channel quality along a particular trajectory, such as the trajectory of mobile device 508.

Load modeler 524 builds statistical models—PDFs—of the load on a given base-station at a given time of day, using load history database 518 and mobility database 516. Operating in conjunction with mobility modeler 522, load modeler 524 builds statistical models of the load along a given trajectory, such as the trajectory of mobile device 508.

Using one or more of the PDFs and mobility patterns thus available, control module 504 produces one or more thresholds or parameters, collectively referred to as policy parameters. For example, in one embodiment, control module 504 produces a signal threshold $S_i$ for i-th requestor mobile device 508. In another embodiment, control module 504 produces a load threshold $L_i$ for i-th requestor mobile device 508. In another embodiment, control module 504 produces a weighting parameter $W_i$ for i-th requestor mobile device 508. Uses of signal threshold $S_i$, load threshold $L_i$, and weighting parameter $W_i$ are described in greater detail with respect to FIGS. 7, 8, and 9.

Using one or more policy parameters from control module 504, and present load conditions at a base-station, such as base-station 122 in FIG. 1, that would be transmitting the requested data, controller 506 produces a rate parameter $R_i$ for i-th requestor mobile device 508 for request 500. Rate parameter Ri is usable by scheduler 530 in the mobile network infrastructure to schedule the rate of transmission of the requested data from the base-station that would be transmitting the requested data.

Figure 6:
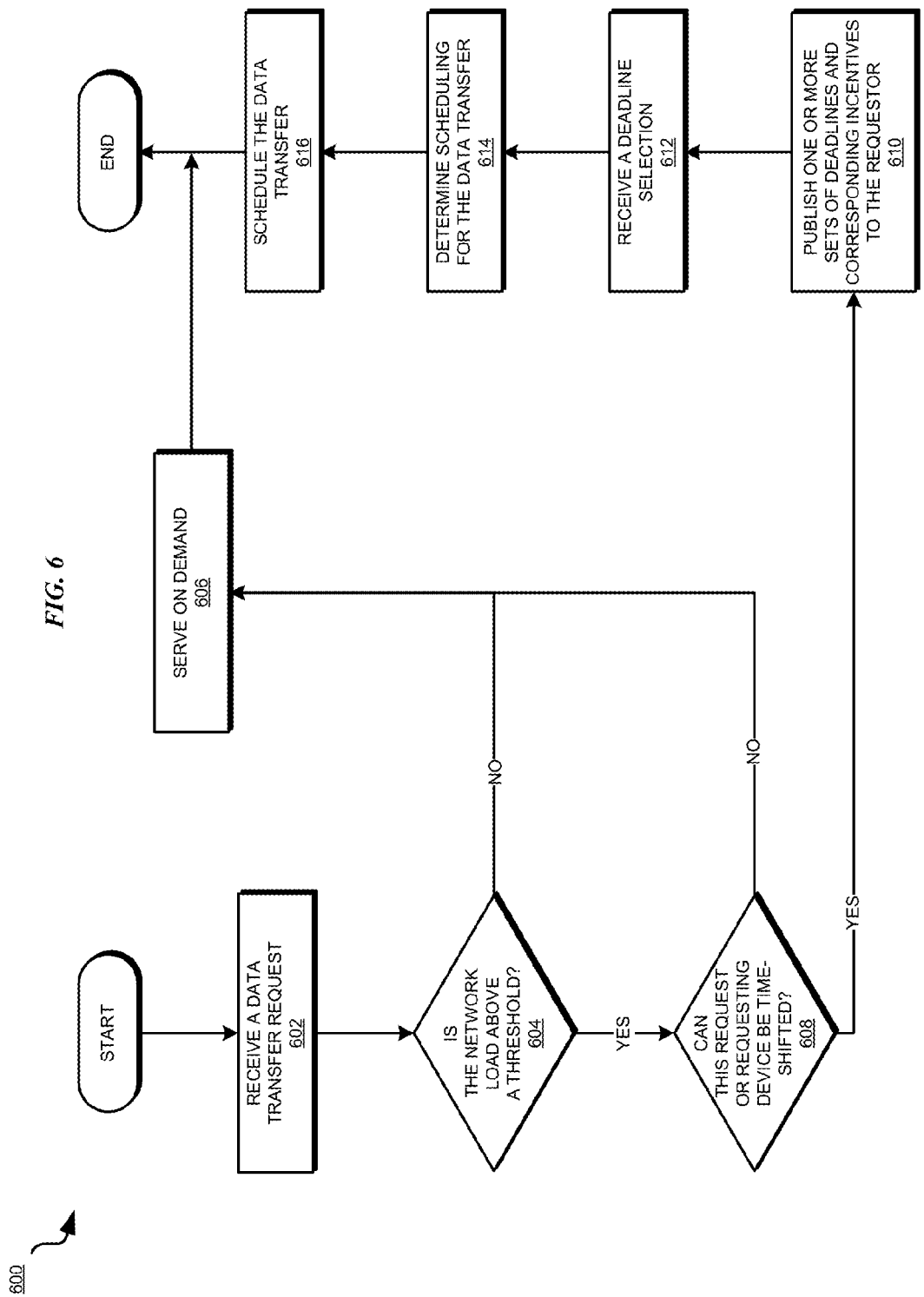
FIG. 6 depicts a block diagram of a process of network and user behavior based time shifted mobile data transmission in accordance with an illustrative embodiment.

With reference to FIG. 6, this figure depicts a block diagram of a process of network and user behavior based time shifted mobile data transmission in accordance with an illustrative embodiment. Process 600 can be implemented using a combination of policy module 502, control module 504, controller 506, and scheduler 530 in FIG. 5.

Process 600 begins by receiving a data transfer request, such as request 500 in FIG. 5, (step 602). Process 600 determines the present network load at the time of the request is above a threshold level of load (step 604). If the network load does not exceed the threshold ("No" path of step 604), process 600 serves the request on demand (step 606). As to the request of step 602, process 600 ends thereafter. Processing a request on demand when the network load permits allows for the expected user-experience and QoS and no deadline negotiations are required.

If the network load exceeds the threshold ("Yes" path of step 604), process 600 determines whether the request of step 602 or a mobile device making the request can be time-shifted (step 608). If the request or the requestor cannot be time-shifted ("No" path of step 608), process 600 serves the request on demand at step 606, and ends thereafter as to the request of step 602.

If the request or the requestor can be time-shifted ("Yes" path of step 608), process 600 publishes one or more sets of time-shifted deadlines and corresponding incentives to the requestor (step 610). Process 600 receives a deadline selection (step 612). In one embodiment, an application executing in a mobile device may select a deadline in manner transparent to a user. For example, the application may select a deadline according to a delay tolerance parameter that is preconfigured according to a day, time, type of data, location of the user, or any other factor. In another embodiment, a user may be prompted to select one of the deadlines.

Process 600 determines the scheduling, i.e., the rate of transmission, for the transfer of the requested data (step 614). Process 600 schedules the data transfer accordingly (step 616). Process 600 ends thereafter for the request of step 602. In one embodiment, for example owing to network load change, user mobility, or channel quality change, process 600 may re-execute for the same request if part of the requested data remains to be transmitted to the requestor mobile device.

Figure 7:
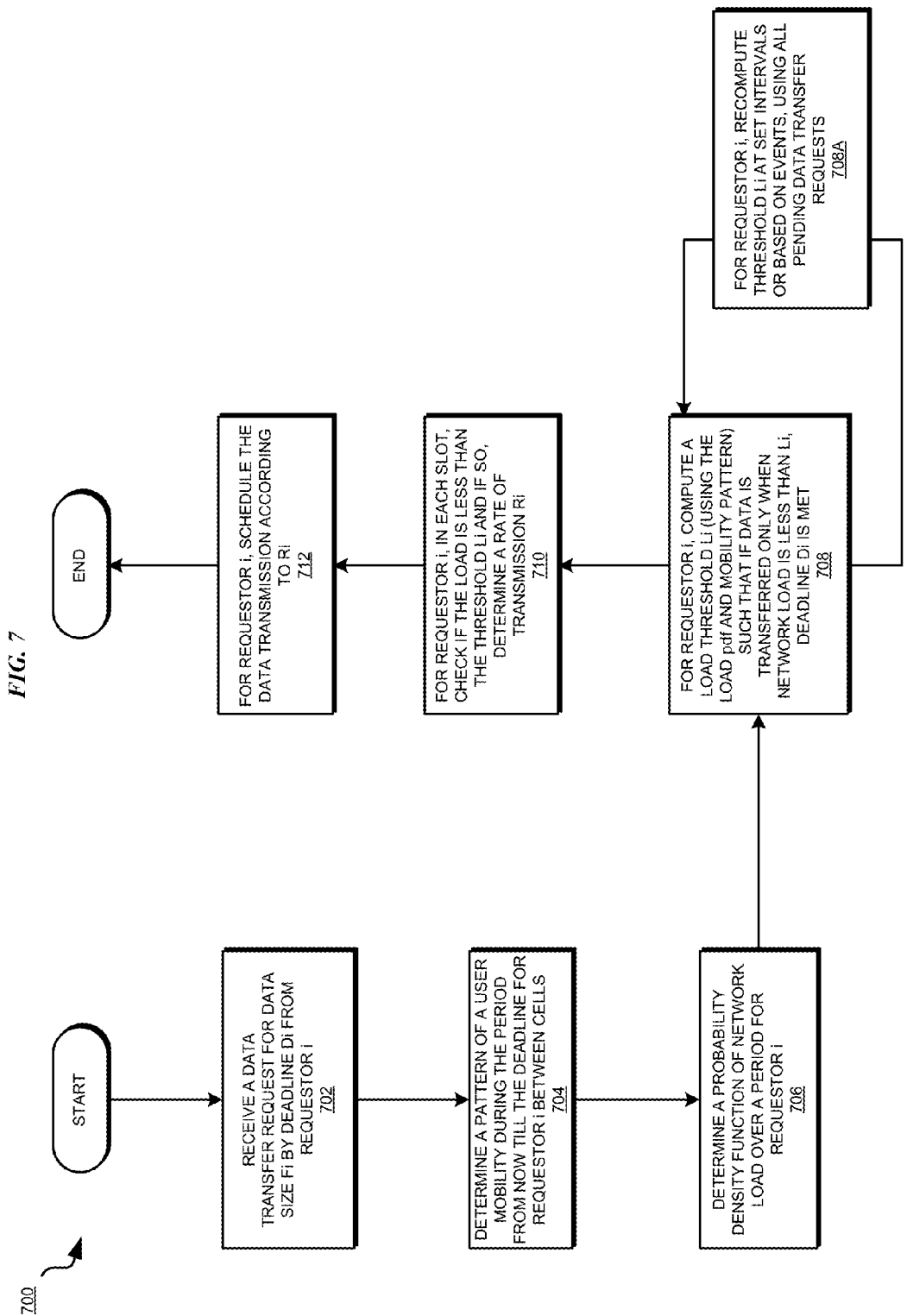
FIG. 7 depicts a flowchart of an example process of load threshold based time-shifting of data transmission in accordance with an illustrative embodiment.

With reference to FIG. 7, this figure depicts a flowchart of an example process of load threshold based time-shifting of data transmission in accordance with an illustrative embodiment. Process 700 can be implemented in control module 504 of FIG. 5 to produce load threshold $L_i$ policy parameter.

Process 700 executes for each requestor i, and begins by receiving a data transfer request for data size $F_i$ by deadline $D_i$ from requestor i (step 702). Process 700 determines a pattern of mobility between cell locations during the period from a present time till deadline Di for requestor i (step 704). Process 700 determines a PDF of network load over a period for requestor i (step 706).

Using the load PDF and the mobility pattern, process 700 computes a load threshold $L_i$ such that if the data is transmitted to the requestor only when the network load is less than $L_i$, deadline $D_i$ is met (step 708).

In each slot, process 700 checks if the load is less than the load threshold $L_i$, and if so, determines a rate of transmission $R_i$ (step 710). At step 708, process 700 recomputes the threshold $L_i$ at set intervals or upon certain events using all pending data requests (step 708A), and adjusts rate $R_i$ accordingly. Process 700 schedules the data transmission according to rate $R_i$ (step 712). Process 700 ends thereafter.

Figure 8:
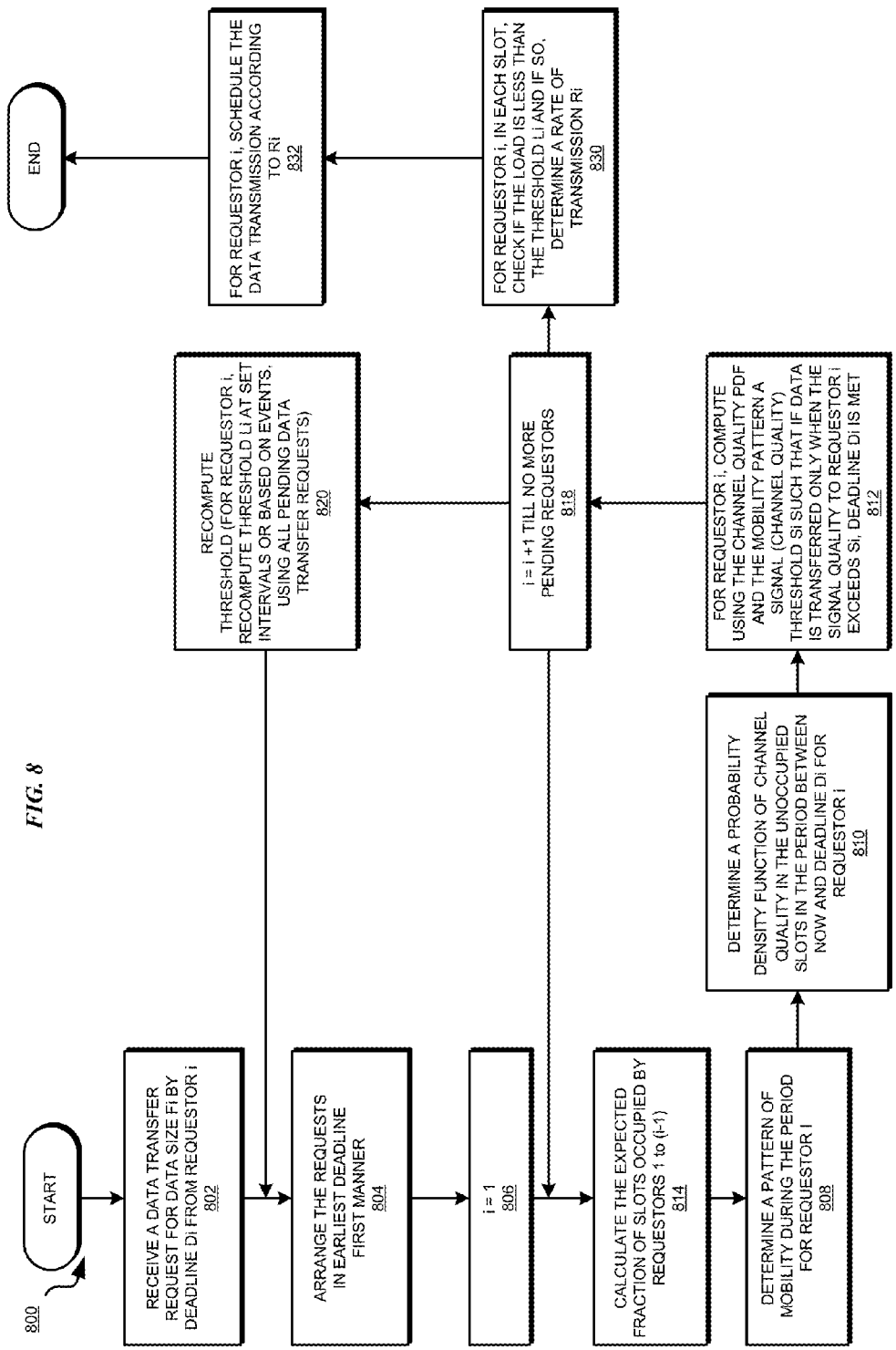
FIG. 8 depicts a flowchart of an example process of signal quality threshold based time-shifting of data transmission in accordance with an illustrative embodiment.

With reference to FIG. 8, this figure depicts a flowchart of an example process of signal quality threshold based time-shifting of data transmission in accordance with an illustrative embodiment. Process 800 can be implemented in control module 504 of FIG. 5 to produce signal threshold $S_i$ policy parameter.

Process 800 executes for each requestor i, and begins by receiving a data transfer request for data size $F_i$ by deadline $D_i$ from requestor i (step 802). Process 800 arranges the data transmission requests from all active requestors in the order of earliest to latest deadlines (step 804).

Assume that a requestor index i is initialized to value 1 (step 806). Process 800 calculates the expected fraction of slots occupied by requestors 1 through i−1 (step 814). Process 800 determines a pattern of mobility between cell locations during the period for requestor i (step 808). Process 800 determines a PDF of channel quality in the unoccupied slots in the period between a present time and deadline $D_i$ for requestor i (step 810).

For requestor i, using the channel quality PDF and the mobility pattern, process 800 computes a signal threshold $S_i$ (a measure of channel quality) such that if the data is transmitted to the requestor only when the signal exceed $S_i$, deadline $D_i$ is met (step 812).

The requestor index i is incremented if more requestors are pending (step 818). If more requestors are pending, process 800 returns to step 814 with the incremented index. In another branch of process 800, process 800 also recomputes the signal threshold, such as upon an event or passage of a set period since the last computed threshold (step 820). For example, process 800 may recompute the threshold $L_i$ at set intervals or upon certain events using all pending data requests. The branch of process 800 returns to step 804.

If no more requestors are pending, process 800 checks if the load is less than the load threshold $L_i$, and if so, determines a rate of transmission $R_i$ (step 830). Process 800 schedules the data transmission according to rate $R_i$ (step 832). Process 800 ends thereafter.

Figure 9:
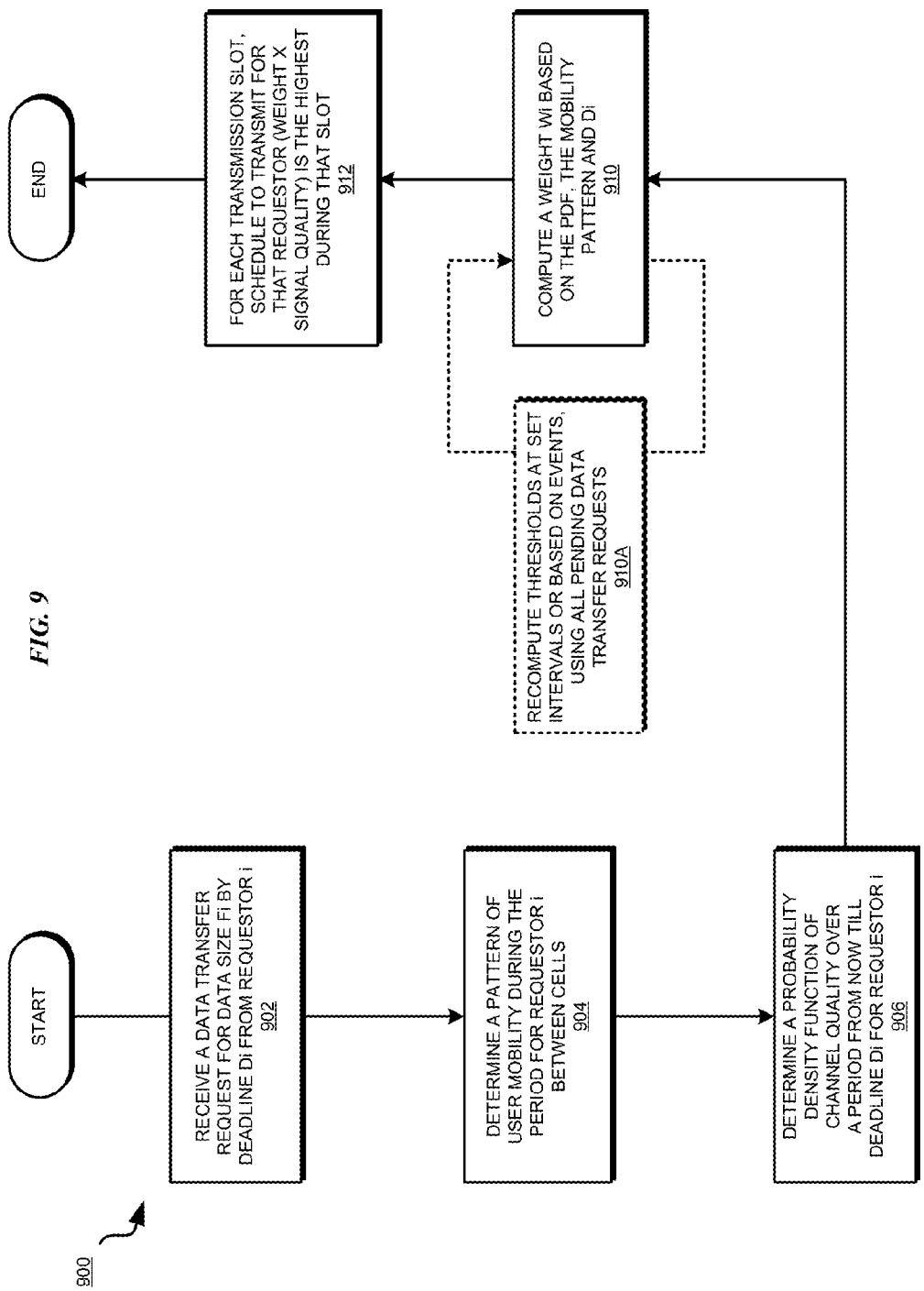
FIG. 9 depicts a flowchart of an example process of weight parameter based time-shifting of data transmission in accordance with an illustrative embodiment.

With reference to FIG. 9, this figure depicts a flowchart of an example process of weight parameter based time-shifting of data transmission in accordance with an illustrative embodiment. Process 900 can be implemented in control module 504 of FIG. 5 to produce signal threshold $S_i$ policy parameter.

Process 900 executes for each requestor i. Process 900 receives a data transfer request for data size $F_i$ by deadline $D_i$ from requestor i (step 902). Process 900 determines a pattern of mobility between cell locations during the period for requestor i (step 904). Process 900 determines a PDF of channel quality over a period from a present time till deadline Di for requestor i (step 906).

For requestor i, using the PDF and the mobility pattern, process 900 computes a weight parameter $W_i$ (step 910). At step 910, process 900 recomputes the weight parameter $W_i$ at set intervals or upon certain events using all pending data requests (step 910A).

For each transmission slot, process 900 schedules to transmit data for such requestor whose product of weight parameter and signal quality is the highest at the time of the time slot (step 912). Process 900 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for network and user behavior based time shifted mobile data transmission. Using an embodiment, resource-heavy requests and requests for predictable data traffic, such as newscasts, can be time-shifted to improve the peak load behavior of a mobile network. An embodiment not only improves the network performance of the mobile network during greater than threshold load times, the embodiment also improves QoS and user-experience during the data transmission, although the experience is delayed.

An embodiment can be implemented to operate in conjunction with a radio network controller component of mobile network's infrastructure. An embodiment receives the requests for data transmissions and analyzes the requests to determine whether and how they can be time-shifted. The time-shifting of an embodiment operates in conjunction with a base-station scheduler at a coarse-grain time scale of a few seconds to a few minutes.

An embodiment leverages statistical information about channel quality and network load to devise a schedule that serves each request before its specified deadline. An embodiment also minimizes the network footprint by varying the rate of feeding the base-station queues so as to opportunistically transmit in periods of low load and high channel quality. An embodiment corrects any errors between prediction based on the models and real experience during transmission to a mobile device by bootstrapping and recomputing the policy parameters at set intervals or upon certain events.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for mobile data transmission, the computer usable code comprising:
   computer usable code for receiving a request for data from a mobile device;
   computer usable code for determining, using a processor and a memory, whether a data transmission over a mobile data communication network in response to the request can be delayed, forming a time-shifting determination;
   computer usable code for determining, responsive to the time-shifting determination being affirmative, a delayed schedule for the data transmission in response to the request such that the data transmission is completed by a deadline; and
   computer usable code for transmitting over the mobile data communication network the data according to the delayed schedule, wherein the computer usable code for determining the delayed schedule further comprises:
   computer usable code for receiving a plurality of requests from a corresponding plurality of mobile devices, wherein each request in the plurality of requests has a corresponding deadline, and wherein the request is one of the plurality of requests and the deadline is one of the plurality of deadlines;
   computer usable code for arranging the plurality of requests in an order of shortest deadline to longest deadline;
   computer usable code for determining a pattern of movement (mobility pattern) of the mobile device during a period;
   computer usable code for determining a probability density function (PDF) of channel quality in the mobile data communication network over the period, wherein the PDF of channel quality is determined using historical channel quality data collected along the mobility patterns during the period;
   computer usable code for computing a signal threshold using the channel quality PDF and the mobility pattern, such that transmitting the data only when signal quality to the mobile device exceeds the signal threshold satisfies the deadline;
   computer usable code for identifying a time slot when the signal quality to the mobile device exceeds the signal threshold, wherein the delayed schedule is based on the identified time slot, and wherein the data is transmitted using the time slot;
   computer usable code for scheduling to transmit second data in response to a second request in the plurality of requests in a second time slot.

2. The computer usable program product of claim 1, further comprising:
   computer usable code for recomputing the signal threshold at one of (i) a set interval, and (ii) at an occurrence of an event in the mobile data communication network.

3. A computer usable program product comprising a computer usable storage device including computer usable code for mobile data transmission, the computer usable code comprising:
   computer usable code for receiving a request for data from a mobile device;
   computer usable code for determining, using a processor and a memory, whether a data transmission over a mobile data communication network in response to the request can be delayed, forming a time-shifting determination;
   computer usable code for determining, responsive to the time-shifting determination being affirmative, a delayed schedule for the data transmission in response to the request such that the data transmission is completed by a deadline; and
   computer usable code for transmitting over the mobile data communication network the data according to the delayed schedule, wherein the computer usable code for determining the delayed schedule further comprises:
   computer usable code for determining a pattern of movement (mobility pattern) of the mobile device during a period;
   computer usable code for determining a probability density function (PDF) of channel quality in the mobile data communication network over the period, wherein the PDF of channel quality is determined using historical channel quality data collected along the mobility patterns during the period;

computer usable code for computing a weight parameter using the channel quality PDF and the mobility pattern;

computer usable code for computing, at a data transmission time slot, a product of the weight parameter and a signal quality to the mobile device, wherein the delayed schedule uses the data transmission time slot responsive to the product having highest value amongst a plurality of products corresponding to a plurality of requests during the data transmission time slot.

4. The computer implemented method of claim 3, further comprising:

recomputing the weight parameter at one of (i) a set interval, and (ii) at an occurrence of an event in the mobile data communication network.

5. A data processing system for mobile data transmission, the data processing system comprising:

a storage device, wherein the storage device stores computer usable program code; and a processor, wherein the processor executes the computer usable program code, and wherein the computer usable program code comprises:

computer usable code for receiving a request for data from a mobile device;

computer usable code for determining, using a processor and a memory, whether a data transmission over a mobile data communication network in response to the request can be delayed, forming a time-shifting determination;

computer usable code for determining, responsive to the time-shifting determination being affirmative, a delayed schedule for the data transmission in response to the request such that the data transmission is completed by a deadline; and computer usable code for transmitting over the mobile data communication network the data according to the delayed schedule, wherein the computer usable code for determining the delayed schedule further comprises:

computer usable code for receiving a plurality of requests from a corresponding plurality of mobile devices, wherein each request in the plurality of requests has a corresponding deadline, and wherein the request is one of the plurality of requests and the deadline is one of the plurality of deadlines;

computer usable code for arranging the plurality of requests in an order of shortest deadline to longest deadline;

computer usable code for determining a pattern of movement (mobility pattern) of the mobile device during a period;

computer usable code for determining a probability density function (PDF) of channel quality in the mobile data communication network over the period, wherein the PDF of channel quality is determined using historical channel quality data collected along the mobility patterns during the period;

computer usable code for computing a signal threshold using the channel quality PDF and the mobility pattern, such that transmitting the data only when signal quality to the mobile device exceeds the signal threshold satisfies the deadline;

computer usable code for identifying a time slot when the signal quality to the mobile device exceeds the signal threshold, wherein the delayed schedule is based on the identified time slot, and wherein the data is transmitted using the time slot;

computer usable code for scheduling to transmit second data in response to a second request in the plurality of requests in a second time slot.

* * * * *